United States Patent Office 3,784,600
Patented Jan. 8, 1974

3,784,600
4-SUBSTITUTED COUMARINS
Max von Strandtmann, Rockaway Township, David T. Connor, Parsippany, and John Shavel, Jr., Mendham, N.J., assignors to Warner-Lambert Company, Morris Plains, N.J.
No Drawing. Filed Oct. 22, 1971, Ser. No. 191,830
Int. Cl. C07d 7/24
U.S. Cl. 260—343.2 R    18 Claims

ABSTRACT OF THE DISCLOSURE 4-substituted coumarins having the following structural formula are disclosed:

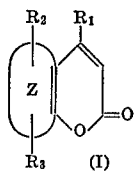

wherein $R_1$ is (methylsulfinyl)methyl, (methylsulfonyl)methyl, acetyl(methylthio)methyl, dimethoxymethyl, formyl, hydroxymethyl, (arylimino)methyl, (arylamino)methyl or (oximino)methyl; Z is an aromatic or heteroaromatic nucleus; $R_2$ and $R_3$ are hydrogen, halogen, alkyl, aralkyl, aryl, alkoxy, acylamino, or hydroxy.

These compounds are prepared by the following reaction scheme:

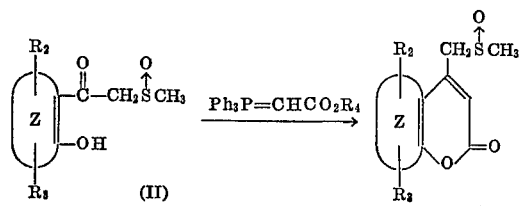

wherein $R_4$ is lower alkyl.

The 4-[(methylsulfinyl)methyl]coumarins are then converted to other 4-substituted coumarins of this invention.

The compounds of this invention are useful as gastric antiscretory agents and are indicated in conditions such as gastric hyperacidity.

The present invention is concerned with 4-substituted coumarins having the following structural formula:

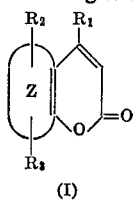

wherein $R_1$ is (methylsulfinyl)methyl, (methylsulfonyl)methyl, acetyl(methylthio)methyl, dimethoxymethyl, formyl, hydroxymethyl, (arylimino)methyl, (arylamino)methyl or (oximino)methyl; Z is an aromatic or heteroaromatic nucleus, such as benzene, naphthalene, phenanthrene, anthracene, pyridine, quinoline, isoquinoline, carboline, thiophene and furane; $R_2$ and $R_3$ are hydrogen, halogen, alkyl, aralkyl, aryl, alkoxy, acylamino, or hydroxy.

In the definitions for $R_1$, $R_2$ and $R_3$, the term "aryl" denotes a monocyclic hydrocarbon radical preferably of 6 to 10 carbon atoms, for example, phenyl, tolyl, and the like. The term "alkyl" denotes a lower aliphatic hydrocarbon radical having 1 to 7 carbon atoms in the carbon chain; for example, methyl, propyl, isopropyl and the like. The term "aralkyl" encompasses alkyl groups in which an aryl group as defined above is substituted for a hydrogen atom such as benzyl, phenethyl, and the like. The term "acyl" denotes those radicals derived from carboxylic acids of less than 12 carbon atoms, preferably the lower alkanoic acid; for example, acetic, propionic, butyric and the like. Also, preferred are the monocyclic carboxylic acids such as benzoic and toluic acids.

The compounds of this invention exhibit antisecretory properties in several species of hosts. For example, when they are tested in accordance with the procedure described by Shay et al., Gastroentrology 5, 43, (1945) and Winter et al., Proc. Soc. Exper. Biol. Med. 111, 544 (1960). These compounds exhibit the desired antisecretory effect at a dose of 50 to 100 mg./kg.

In order to use these compounds, they are formulated with diluents such as lactose into dosage forms such as tablets or capsules, or they can be combined with diluents such as water for injection and formulated into dosage forms suitabe for injection.

The compounds of this invention are indicated to provide symptomatic relief in conditions such as gastric hyperacidity. The general dosage range is about 50–100 mg. two or three times daily, orally or by injection.

According to the present invention, compounds of Type I above wherein $R_1$ is —$CH_2SOCH_3$ are prepared from the corresponding β-ketosulfoxides of Type II by the following reaction scheme:

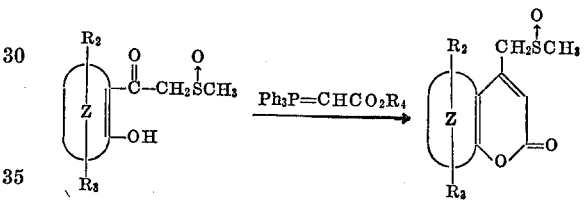

wherein $R_4$ is lower alkyl.

The preparation of the starting β-ketosulfoxides of Type II is the subject of our copending patent application No. 174,947. (Carboalkoxymethylene)triphenylphosphoranes are commercially available, e.g., carbethoxymethylenetriphenylphosphorane is available from Aldrich Chemical Company.

Compounds of Type I where $R_1$=—$CH_2SO_2CH_3$ are prepared by oxidation of the corresponding sulfoxide with m-chloroperbenzoic acid or by the reaction of (carbethoxymethylene)triphenylphosphorane with the corresponding β-ketosulfone analogous to Type II.

The 4-[(methylsulfinyl)methyl]coumarins are converted to 4-formylcoumarins by the reaction sequence shown below:

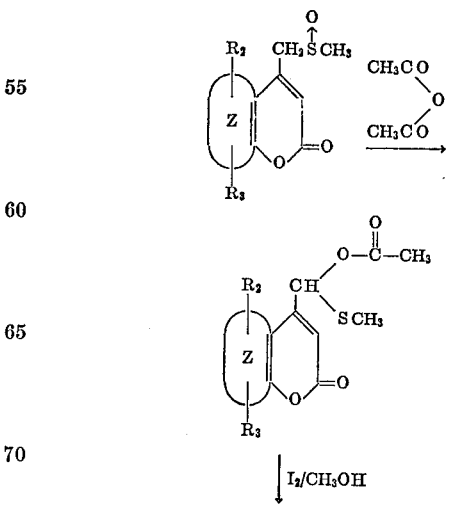

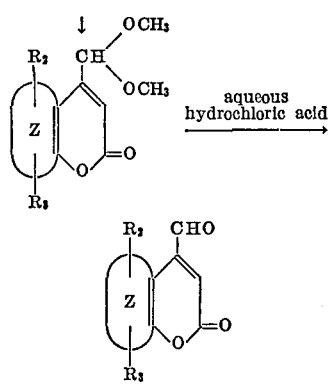

4-formylcoumarins are key intermediates for the synthesis of many novel coumarins. Examples are shown below:

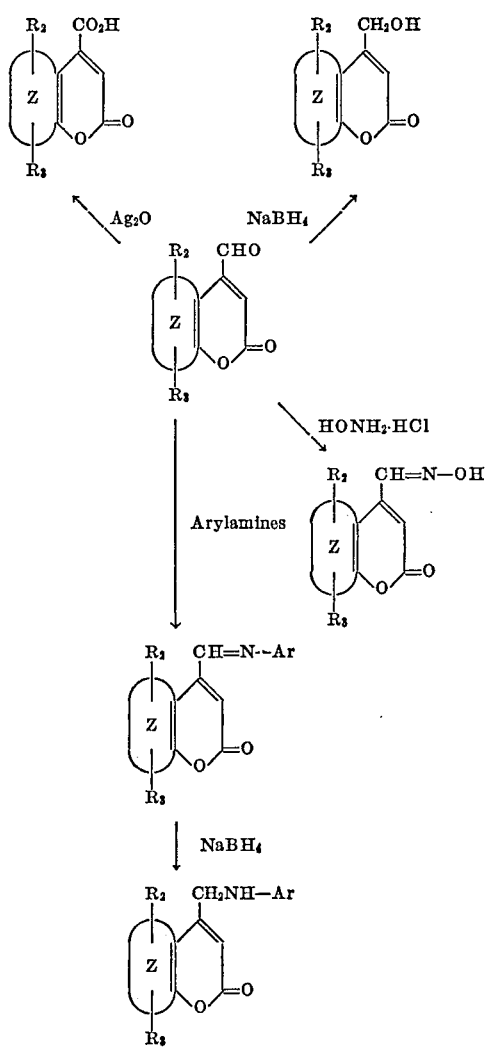

In order to illustrate the practice of this invention the following examples are included.

EXAMPLE 1

4-[(methylsulfinyl)methyl]coumarin 2-hydroxyl - 1 - [(methylsulfinyl)-acetyl]benzene (9.9 g., 0.05 m.) and (carbethoxymethylene)triphenylphosphorane (17.4 g., 0.05 m.) were refluxed in dioxane (250 ml.) for four hours. (Carbethoxymethylene)triphenylphosphorane (17.4 g., 0.05 m.) was added and refluxing was continued for a further 16 hours. The reaction mixture was cooled, the product was filtered off and recrystallized from ethanol to give white crystals (9.4 g., 84%), M.P. 203–204°.

*Analysis.*—Calcd. for $C_{11}H_{10}O_3S$ (percent): C, 59.44; H, 4.54; S, 14.42. Found (percent): C, 59.67; H, 4.54; S, 14.41.

EXAMPLE 2

3-hydroxy-β-[(methylsulfinyl)methyl]-2-pyridineacrylic acid δ-lactone

Prepared by the general procedure described above. Recrystallization from methanol gave yellow crystals, M.P. 176–177° (77% yield).

*Analysis.*—Calcd. for $C_{10}H_9NO_3S$ (percent): C, 53.89; H, 4.06; N, 6.27; S, 14.36. Found (percent): C, 53.94; H, 4.11; N, 6.38; S, 14.52.

EXAMPLE 3

7-fluoro-4-hydroxy-β-[(methylsulfinyl)methyl]-3-quinoline-acrylic acid δ-lactone Prepared by the general method described above. Product was isolated in 12% yield. Recrystallization from DMF gave yellow crystals, M.P. 223–224°.

*Analysis.*—Calcd. for $C_{14}H_{10}FNO_3S$ (percent): C, 57.73; H, 3.46; N, 4.81; S, 11.01. Found (percent): C, 57.74; H, 3.47; N, 4.77; S, 10.98.

EXAMPLE 4

3-hydroxy-β-[(methylsulfinyl)methyl]-2-naphthalene-acrylic acid δ-lactone

Prepared by the general procedure described above. Recrystallization from DMF gave pale-yellow crystals (93% yield). M.P. 248–249°.

*Analysis.*—Calcd. for $C_{15}H_{12}O_3S$ (percent): C, 66.16; H, 4.44; S, 11.77. Found (percent): C, 66.37; H, 4.45; S, 11.73.

EXAMPLE 5

1-hydroxy-β-[(methylsulfinyl)methyl]-2-naphthalene-acrylic acid δ-lactone

Prepared by the general method described above. Recrystallization from DMF gave pale-yellow crystals (90% yield). M.P. 215–216°.

*Analysis.*—Calcd. for $C_{15}H_{12}O_3S$ (percent): C, 66.16; H, 4.44; S, 11.77. Found (percent): C, 66.11; H, 4.49; S, 11.63.

EXAMPLE 6

2-hydroxy-β-[(methylsulfonyl)methyl]-1-naphthalene-acrylic acid δ-lactone

Prepared from 1-[(methylsulfonyl)acetyl]-2-naphthol (10 g.) by the general procedure as described in Example 1. Recrystallization gave yellow crystals (7.54 g., 69%), M.P. 259–262°.

*Analysis.*—Calcd. for $C_{15}H_{12}O_4S$ (percent): C, 62.49; H, 4.20; S, 11.12. Found (percent): C, 62.19; H, 4.28; S, 11.37.

EXAMPLE 7

4-[(methylsulfonyl)methyl]coumarin m-Chloroperbenzoic acid (10.1 g., .058 m.) was added to a solution of 4 - [(methylsulfinyl)methyl]-coumarin (11.1 g., .05 m.) in methylene chloride (300 ml.). The reaction mixture was stirred for two hours at room temperature. The white solid was filtered, washed with methylene chloride and recrystallized from DMF to give white crystals, (9.3 g., 66%), M.P. 224–225°.

*Analysis.*—Calcd. for $C_{11}H_{10}O_4S$ (percent): C, 55.45; H, 4.23; N, 13.46. Found (percent): C, 55.63; H, 4.16; N, 13.35.

EXAMPLE 8

4-[hydroxy(methylthio)methyl]coumarin acetate

4-[(methylsulfinyl)-methyl]coumarin(1 g., .0045 m.) in acetic anhydride (25 ml.) was refluxed for six hours.

The solvent was removed under reduced pressure to give a yellow oil which crystallized on standing. Recrystallization from ethyl acetate gave white crystals (1 g., 83%), M.P. 110–112°.

*Analysis.*—Calcd. for $C_{13}H_{12}O_4S$ (percent): C, 59.08; H, 4.58; S, 12.13. Found (percent): C, 59.32; H, 4.70; S, 11.95.

EXAMPLE 9

3-hydroxy-β-[acetyl(methylthio)methyl]-2-pyridineacrylic acid δ-lactone

Prepared by the general method as described in Example 8. Recrystallization from methanol gave off-white crystals (63% yield), M.P. 115–117°.

*Analysis.*—Calcd. for $C_{12}H_{11}NO_4S$ (percent): C, 54.33; H, 4.18; N, 5.28; S, 12.09. Found (percent): C, 54.49; H, 4.21; N, 5.35; S, 12.07.

EXAMPLE 10

3-hydroxy-β-[acetyl(methylthio)methyl]-2-naphthaleneacrylic acid δ-lactone

Prepared by the general method as described in Example 8. Recrystallization from DMF gave pale-yellow crystals (87% yield), M.P. 201–204°.

*Analysis.*—Calcd. for $C_{17}H_{14}O_4S$ (percent): C, 64.95; H, 4.49; S, 10.20. Found (percent): C, 64.66; H, 4.57; S, 10.23.

EXAMPLE 11

1-hydroxy-β-[acetyl(methylthio)methyl]-2-naphthaleneacrylic acid δ-lactone

Prepared by the general procedure as described in Example 8. Recrystallization from DMF gave pale-yellow crystals (85% yield), M.P. 167–169°.

*Analysis.*—Calcd. for $C_{17}H_{14}O_4S$ (percent): C, 64.95; H, 4.49; S, 10.20. Found (percent): C, 64.79; H, 4.52; S, 10.19.

EXAMPLE 12

4-[dimethoxymethyl]coumarin

4-[hydroxy(methylthio)methyl]coumarin acetate (9.6 g., 0.36 m.) and iodine (5.56 g., .043 m.) in methanol (150 ml.) were refluxed for six hours. The methanol was removed under reduced pressure and the brown residue was dissolved in chloroform. The chloroform solution was extracted with saturated sodium thiosulfate solution 2× 30 ml.), washed with water, dried over MgSO$_4$ and evaporated to give a colorless gum which crystallized on standing. The gum was recrystallized from methanol to give white crystals (7.2 g., 90%), M.P. 87–89°.

*Analysis.*—Calcd. for $C_{12}H_{12}O_4$ (percent): C, 65.44; H, 5.49. Found (percent): C, 65.57; H, 5.50.

EXAMPLE 13

β-(dimethoxymethyl)-3-hydroxy-2-pyridineacrylic acid δ-lactone

Prepared by the general procedure as described in Example 12. Recrystallization from ethyl acetate gave white crystals (46% yield), M.P. 119–121°.

*Analysis.*—Calcd. for $C_{11}H_{11}NO_4$ (percent): C, 59.73; H, 5.01; N, 6.33. Found (percent): C, 59.44; H, 4.96; N, 6.42.

EXAMPLE 14

β-(Dimethoxymethyl)-1-hydroxy-2-naphthaleneacrylic acid δ-lactone

Prepared by the general procedure as described in Example 12. Recrystallization from ethyl acetate gave pale-yellow crystals (72% yield), M.P. 155–160°.

*Analysis.*—Calcd. for $C_{16}H_{14}O_4$ (percent): C, 71.10; H, 5.22. Found (percent): C, 70.83; H, 5.31.

EXAMPLE 15

4-formylcoumarin

A suspension of 4-(dimethoxymethyl)coumarin (12 g., 0.055 m.) in 20% hydrochloric acid (20 ml.) was refluxed with stirring for three hours. The reaction mixture was cooled. The bright yellow solid was filtered off and recrystallized from ethyl acetate to give fine yellow needles (9 g., 93%), M.P. 155–157°.

*Analysis.*—Calcd. for $C_{10}H_6O_3$ (percent): C, 68.96; H, 3.47. Found (percent): C, 68.79; H, 3.54.

EXAMPLE 16

4-formyl-2H-naphtha[1,2-b]pyran-2-one

Prepared by the same procedure as described in Example 15. Recrystallization from ethyl acetate gave yellow crystals (86% yield), M.P. 200–203°.

*Analysis.*—Calcd. for $C_{14}H_8O_3$ (percent): C, 74.99; H, 3.59. Found (percent): C, 74.93; H, 3.71.

EXAMPLE 17

4-(hydroxymethyl)coumarin

Sodium borohydride (0.0025 m.) was added to a solution of 4-formylcoumarin (1.74 g. 0.0025 m.) in aqueous dioxane at room temperature. The reaction mixture was stirred for three hours at room temperature. The dioxane was removed under reduced pressure to give a white solid. The product was washed with water, dried and recrystallized from ethyl acetate to give white needles (1.5 g., 85%), M.P. 137–138°.

*Analysis.*—Calcd. for $C_{10}H_8O_3$ (percent): C, 68.18; H, 4.58. Found (percent): C, 68.34; H, 4.60.

EXAMPLE 18

Coumarin-4-carboxylic acid 4-formylcoumarin (1.74 g., 0.01 m.) was added to a suspension of silver oxide (prepared by adding silver nitrate (2 g.) in water (25 ml.) to sodium hydroxide (1 g.) in water (5 ml.)). The reaction mixture was stirred at room temperature for one hour and filtered. The residue was washed with hot water. The filtrate and washings were combined, acidified at ice-bath temperature with 10 N hydrochloric acid and extracted with ethyl acetate. The extracts were dried over MgSO$_4$ and evaporated to give a yellow gum, which crystallized from ethyl acetate. Recrystallization from ethyl acetate gave yellow crystals (0.6 g., 32%), M.P. 180–182°.

*Analysis.*—Calcd. for $C_{10}H_6O_4$ (percent): C, 63.16; H, 3.18. Found (percent): C, 63.31; H, 3.30.

EXAMPLE 19

4-{[(3,4-dimethylphenyl)imino]methyl}coumarin

A mixture of 4-formylcoumarin (1.74 g., 0.01 m.) and 3,4-dimethylaniline (1.21 g., 0.01 m.) in benzene (50 ml.) was refluxed under a water separator for three hours. The solvent was removed under reduced pressure to give a yellow solid. Recrystallization from ethyl acetate gave yellow crystals (2.37 g., 85%), M.P. 146–148°.

*Analysis.*—Calcd. for $C_{18}H_{15}NO_2$ (percent): C, 77.96; H, 5.45; N, 5.05. Found (percent): C, 77.96; H, 5.47; N, 5.14.

EXAMPLE 20

4-[(phenylimino)methyl]coumarin

Prepared by the same procedure as described in Example 19. Recrystallization from ethyl acetate gave yellow crystals (80% yield), M.P. 148–150°.

*Analysis.*—Calcd. for $C_{16}H_{11}NO_2$ (percent): C, 77.09; H, 4.45; N, 5.62. Found (percent): C, 76.80; H, 4.53; N, 5.42.

EXAMPLE 21

4-formylcoumarin 4-oxime

A mixture of 4-formylcoumarin (5.22 g., 0.03 m.), hydroxylamine hydrochloride (2.07 g., 0.03 m.) and sodium acetate (1 g.) in water (5 ml.) and 95% ethanol (50 ml.) was refluxed for five hours. The reaction mixture was poured onto ice. The white solid which precipitated was filtered off and washed with water. Recrystallization from ethyl acetate-methanol gave white crystals (4.4 g., 77%), M.P. 246–248°.

*Analysis.*—Calcd. for $C_{10}H_7NO_3$ (percent): C, 63.49; H, 3.73; N, 7.40. Found (percent): C, 63.71; H, 3.71; N, 7.17.

EXAMPLE 22

4-[(3,4-dimethylanilino)methyl]coumarin

Sodium borohydride (1.15 g., 0.03 m.) was added to an ice-cold suspension of 4-{[(3,4-dimethylphenyl)imino]methyl}coumarin (4.0 g., 0.018 m.) in methanol (50 ml.). The reaction mixture was stirred for three hours at room temperature. The solvent was partially removed under reduced pressure. Water was added and the aqueous solution was extracted with ether. The extracts were dried over $MgSO_4$ and evaporated to give a yellow solid. Recrystallization from ethyl acetate gave pale-yellow crystals (2.1 g., 52%), M.P. 148–149°.

*Analysis.*—Calcd. for $C_{18}H_{17}NO_2$ (percent): C, 77.40; H, 6.13; N, 5.01. Found (percent): C, 77.14; H, 6.11; N, 5.09.

We claim:

1. A compound of the formula:

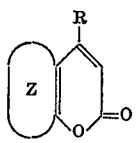

wherein R is (methylsulfinyl)methyl, (methylsulfonyl)methyl, acetoxy(methylthio)methyl, dimethoxymethyl, formyl, hydroxymethyl, (oximino)methyl, (phenylimino)methyl in which the phenyl group is unsubstituted or substituted by one or two alkyl groups having 1 to 6 carbon atoms, (naphthylimino)methyl, (phenylamino)methyl in which the phenyl group is unsubstituted or substituted by one or two alkyl groups having 1 to 6 carbon atoms or (naphthylamino)methyl Z is benzene, naphthalene, phenanthrene, anthracene.

2. A compound according to claim 1 which is 4-[(methylsulfinyl)methyl]coumarin.

3. A compound according to claim 1 which the 3-hydroxy - β - [(methylsulfinyl)methyl] - 2 - naphthaleneacrylic acid δ-lactone.

4. A compound according to claim 1 which is 1-hydroxy - β - [(methylsulfinyl)methyl] - 2 - naphthaleneacrylic acid δ-lactone.

5. A compound according to claim 1 which is 2-hydroxy - β - [(methylsulfonyl)methyl] - 1 - naphthaleneacrylic acid δ-lactone.

6. A compound according to claim 1 which is 4-[(methylsulfonyl)methyl]coumarin.

7. A compound according to claim 1 which is 4-[hydroxy(methylthio)methyl]coumarin acetate.

8. A compound according to claim 1 which is 3-hydroxy - β - [acetyl(methylthio)methyl]-2-naphthaleneacrylic acid δ-lactone.

9. A compound according to claim 1 which is 1-hydroxy - β - [acetyl(methylthio)methyl]-2-naphthaleneacrylic acid δ-lactone.

10. A compound according to claim 1 which is 4-(dimethoxymethyl)coumarin.

11. A compound according to claim 1 which is β-(dimethoxymethyl) - 1 - hydroxy - 2-naphthaleneacrylic acid δ-lactone.

12. A compound according to claim 1 which is 4-formylcoumarin.

13. A compound according to claim 1 which is 4-formyl-2H-naphtha[1,2-b]pyran-2-one.

14. A compound according to claim 1 which is 4-(hydroxymethyl)coumarin.

15. A compound according to claim 1 which is 4-[(3,4-dimethylphenyl)imino]methyl coumarin.

16. A compound according to claim 1 which is 4-[(phenylimino)methyl]coumarin.

17. A compound according to claim 1 which is 4-formylcoumarin 4-oxime.

18. A compound according to claim 1 which is 4-[(3,4-dimethylanilino)methyl]coumarin.

References Cited

UNITED STATES PATENTS 3,438,988    4/1969    Giudicelli et al.     260—343.2 X
3,658,847    4/1972    Fried             260—343.2 X JOHN M. FORD, Primary Examiner U.S. Cl. X.R.

260—294.8 C, 283 S, 287 R, 295 F; 424—279